(12) United States Patent
Gilmore

(10) Patent No.: US 8,271,369 B2
(45) Date of Patent: Sep. 18, 2012

(54) FINANCIAL MODELING AND FORECASTING SYSTEM

(75) Inventor: Norman Gilmore, Los Angeles, CA (US)

(73) Assignee: Norman Gilmore, Los Angeles, CA (US)

(*) Notice: Subject to any disclaimer, the term of this patent is extended or adjusted under 35 U.S.C. 154(b) by 2074 days.

(21) Appl. No.: 10/800,270

(22) Filed: Mar. 12, 2004

(65) Prior Publication Data

US 2004/0181378 A1 Sep. 16, 2004

Related U.S. Application Data

(60) Provisional application No. 60/454,086, filed on Mar. 12, 2003.

(51) Int. Cl.
G06Q 40/00 (2012.01)
(52) U.S. Cl. .......................................... 705/36 R; 705/35
(58) Field of Classification Search .................... 705/35, 705/36 R
See application file for complete search history.

(56) References Cited

U.S. PATENT DOCUMENTS

| | | | |
|---|---|---|---|
| 6,070,152 A * | 5/2000 | Carey et al. ...................... | 705/35 |
| 6,167,406 A | 12/2000 | Hoskins et al. | |
| 6,249,770 B1 | 6/2001 | Erwin et al. | |
| 6,345,259 B1 | 2/2002 | Sandoval | |
| 6,615,204 B1 * | 9/2003 | Menon ............................. | 707/3 |
| 6,631,497 B1 * | 10/2003 | Jamshidi et al. ............... | 715/205 |
| 6,662,357 B1 * | 12/2003 | Bowman-Amuah .......... | 717/120 |
| 6,957,191 B1 * | 10/2005 | Belcsak et al. ................. | 705/38 |
| 7,003,482 B1 * | 2/2006 | Margoscin et al. ............. | 705/35 |
| 7,039,920 B2 * | 5/2006 | Wall et al. ...................... | 719/316 |
| 7,043,736 B2 * | 5/2006 | Wall et al. ...................... | 719/316 |
| 7,111,016 B2 * | 9/2006 | Gurevich ....................... | 717/108 |
| 7,155,667 B1 * | 12/2006 | Kotler et al. ................... | 715/210 |
| 2001/0041995 A1 | 11/2001 | Eder | |
| 2001/0047274 A1 | 11/2001 | Borton | |
| 2001/0053991 A1 | 12/2001 | Bonabeau | |
| 2002/0002579 A1 | 1/2002 | Holden et al. | |
| 2002/0026347 A1 | 2/2002 | Yanagino et al. | |
| 2002/0026630 A1 | 2/2002 | Schmidt et al. | |
| 2002/0059079 A1 | 5/2002 | Negri | |
| 2002/0077842 A1 | 6/2002 | Charisius et al. | |
| 2002/0087336 A1 | 7/2002 | Hale et al. | |
| 2002/0091580 A1 | 7/2002 | Wang | |
| 2002/0169658 A1 | 11/2002 | Adler | |
| 2002/0174006 A1 | 11/2002 | Rugge et al. | |
| 2002/0174059 A1 | 11/2002 | Guo | |
| 2003/0061195 A1 * | 3/2003 | Laborde et al. ................... | 707/1 |
| 2003/0061225 A1 * | 3/2003 | Bowman et al. ............... | 707/100 |
| 2003/0088586 A1 * | 5/2003 | Fitzpatrick et al. ........... | 707/200 |
| 2003/0115207 A1 * | 6/2003 | Bowman et al. ............... | 707/100 |
| 2003/0120600 A1 * | 6/2003 | Gurevich ........................ | 705/50 |
| 2003/0225736 A1 * | 12/2003 | Bakalash et al. ................. | 707/1 |
| 2003/0229652 A1 * | 12/2003 | Bakalash et al. ............... | 707/200 |
| 2004/0024720 A1 * | 2/2004 | Fairweather .................... | 706/46 |
| 2004/0034615 A1 * | 2/2004 | Thomson et al. ................. | 707/1 |

(Continued)

Primary Examiner — Jagdish Patel
Assistant Examiner — Sara C Hamilton
(74) Attorney, Agent, or Firm — Ditthavong Mori & Steiner, P.C.

(57) ABSTRACT

An approach for forecasting and modeling is provided. A software system (i.e., the Forecast and Modeling system) supports enterprise data collection to build large scale simulation models, which can be linked into a single up-to-date model of planned corporate activity and options. The Forecast and Modeling system advantageously provides re-usable financial components, and enables auditing and analysis of historical plans and beliefs.

17 Claims, 5 Drawing Sheets

U.S. PATENT DOCUMENTS

2004/0064327 A1* 4/2004 Humenansky et al. ........... 705/1
2004/0064348 A1* 4/2004 Humenansky et al. ........... 705/7
2004/0064349 A1* 4/2004 Humenansky et al. ........... 705/7
2004/0064433 A1* 4/2004 Thier et al. ........................ 707/1
2005/0021523 A1* 1/2005 Farag ............................ 707/100

* cited by examiner

FINANCIAL MODELING AND FORECASTING SYSTEM

RELATED APPLICATIONS

This application is related to, and claims the benefit of the earlier filing date under 35 U.S.C. §119(e) of, U.S. Provisional Patent Application filed Mar. 12, 2003 (Ser. No. 60/454,086), entitled "Financial Modeling and Forecasting System"; the entirety of which is incorporated herein by reference.

FIELD OF THE INVENTION

The present invention relates to data processing, and more particularly to a software system that supports enterprise data collection to build large scale simulation models.

BACKGROUND OF THE INVENTION

Spreadsheets have an ubiquitous role in the corporate decision making process. However, despite the fact that an ever increasing amount of information is available in near-real time in an enterprise, business planning involving spreadsheets fails to take advantage of such up to date information, as the use of these spreadsheets is still ad-hoc and labor intensive. For example, aggregation of all the spreadsheets in an organization into a master model of the corporation is not within the contemplation of traditional business practices. Logistically, locating a current version of every spreadsheet is a significant and arduous task. Thus, conventional business modeling lacks coordination and optimal effectiveness.

In particular, many businesses use spreadsheets for business models, sales forecasts, product profitability estimates, partnership models, Merger and Acquisition (M&A) analysis and a host of other business decisions. Unfortunately, spreadsheet store models in files which are typically scattered on individual hard drives around the enterprise, inaccessible, who-knows-when or by-who updated, and available only if that person is known to have the information, and is physically present in the office to transmit the file (e.g., by e-mail, etc.).

In other approaches, some organizations use software more sophisticated than spreadsheets for forecasting sales or product profitability. However, these software lack applicability to varying types of organizations and/or products. As a result, the users who create and use spreadsheets in a modern corporation can only create thousands upon thousands of knowledge islands that cannot be integrated into a comprehensive model of corporate activities and opportunities.

Furthermore, it is noted that spreadsheets are not suitable for truly effective modeling. The traditional spreadsheet paradigm provide a method of calculating the values of cells on a grid using fixed formulas that refer to other cells containing fixed formulas or fixed values. Each cell displays the value of the formula it contains. Formulas cannot alter other cells or insert or delete cells. Cells are the only method of storing values. Formulas can be recomputed automatically when any cell referred to by that formula changes. It is noted that only scalar types are supported. Some spreadsheets support formulas that return arrays. This is a mechanism to save memory, and has no functional difference from using individual cells and formulas to accomplish the same result. For example, once constructed, arrays cannot shrink or grow, a feature of arrays in most computer languages. Another drawback is that the user cannot write iterative algorithms using formulas, because there are no looping constructs and no function definition constructs available in the formula language.

Certain spreadsheets include so-called "macro" or "scripting" languages, which are essentially traditional procedural programming languages such as BASIC. These languages allow scripts to be written that use iteration to calculate values or modify the spreadsheet. A key drawback is that these features require substantial additional skill and sophistication from the user. These languages introduce variables and formulas that not shown on the spreadsheet grid. Also, traditionally, spreadsheet formulas cannot refer to variables created by scripts. Scripts must output their results by modifying spreadsheet cells or by being called as a function in a formula. Many errors that may occur in a script, such as references to non-existent cells, can only be detected as run-time errors, rather than design-time errors. The primary advanced data structure available to the scripts for manipulation and data storage is the two or three dimensional spreadsheet document itself. Conventionally, there are no specific methods or structure of these scripting languages that are designed specifically to facilitate simulation and aggregation of simulations.

Largely because of their inherent structure, spreadsheets encounter problems with respect to handling probabilistic inputs, building simulations, handling decision trees and resource dependence, re-using models, aggregating models, and re-using summary models. Building up a scaled up model of a large business with all of the varied contingencies and probabilities has not been feasible under conventional approaches. These problems are so deeply embedded in the design of spreadsheets that a solution to this collection of problems no longer fits the common conception of the term spreadsheet.

Therefore, there is a need for a system that addresses a number of drawbacks associated with conventional spreadsheets used for business models, sales forecasts, product profitability estimates, partnership models, and mergers and acquisition analysis, as well as other business decisions.

SUMMARY OF THE INVENTION

These and other needs are addressed by the present invention, which provides a software system (i.e., the Forecast and Modeling system) that supports enterprise data collection to build large scale simulation models, which can be linked into a single up-to-date model of planned corporate activity and options. The software system advantageously provides reusable financial components, and enables auditing and analysis of historical plans and beliefs. A client-server approach is employed to implement the following representative functionalities: (1) accessibility, accountability, and auditability; (2) data collection; (3) financial data publishing; (4) financial modeling (in a multi-user collaborative environment); and (5) reporting. For accountability, a server program provides authentication of users. The client program enables creation (or uploading) of financial models, and controls user access to such models. The server program records material activities of the users, along with a time stamp, user identifier, and associated change. In terms of data collection, the client program can accommodate fuzzy data by allowing the user to enter variables with any number of representations (e.g., a range of values, an optional confidence factor, a curve, etc.). The server program, in support of data publishing, permits the users to name each model component and optionally attach explanatory comments; the users through the client program can access model components when properly parameterized. With respect to financial modeling, the Forecast and Modeling system also incorporates a query language to assist in analysis and reporting of computed results. Additionally, the Forecast and Modeling system supports synchronization of changes by multiple clients operating concurrently, thereby enabling multi-user collaboration of financial models. As regards model validation, a method is implemented to allow the user to submit a test query, which enables highlighting of a summary query. The above approach advantageously provides a robust, flexible, and accurate business forecasting and modeling tool.

According to one aspect of the present invention, a method for providing forecasting and modeling is disclosed. The method includes collecting data in a multi-user collaborative environment; and generating a financial model with re-usable financial components based upon the collected data, wherein the financial model supports user approval of selected ones of the financial components.

According to another aspect of the present invention, a system for providing forecasting and modeling is disclosed. The system includes means for collecting data in a multi-user collaborative environment over a data network; and a modeling module configured to generate a financial model with re-usable financial components based upon the collected data, wherein the financial model supports user approval of selected ones of the financial components.

According to yet another aspect of the present invention, a method for providing collaborative forecasting and modeling is disclosed. The method includes storing a request object submitted by a first user and destined for a second user, wherein the request object requests information relating to a financial model, and the request object includes one of an activator and program to collect the information and to validate a response from the second user. The response object conforms to a class interface specified by the first user. The method also includes routing the request object to a second user, wherein the second user selectively delegates responsibility for responding to the request object to a third user.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not way of limitations, in the figures of the accompanying drawings and in which like reference numerals refer to similar elements and in which.

DESCRIPTION OF THE PREFERRED EMBODIMENT

A system, method, and software for forecasting and modeling are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
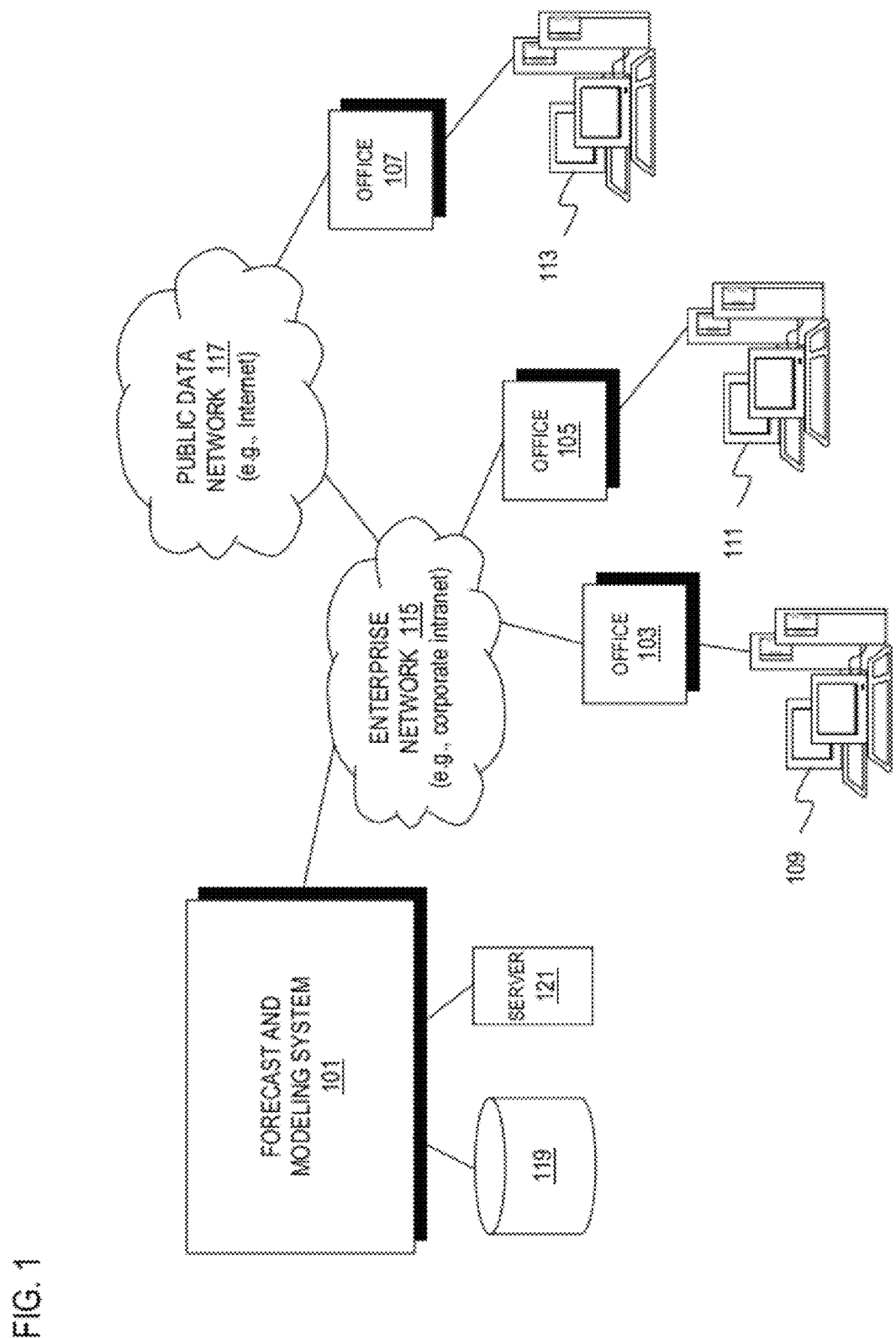
FIG. 1 is a diagram of a forecasting and modeling system operating in an enterprise environment, according to an embodiment of the present invention.

FIG. 1 is a diagram of a forecasting and modeling system operating in an enterprise environment, according to an embodiment of the present invention. As shown, a Forecast and Modeling system 101 enables numerous users within the enterprise to build models of business activity and integrate them into a single up-to-date model of planned corporate activity and options. For the purposes of explanation, the enterprise or organization comprises three offices 103, 105, 107, which contain the respective hosts 109, 111, 113. These hosts 109, 111, 113 can be standalone computing systems, or networked over a local area network (LAN). Connectivity among the offices 103, 105, 107 is supported by an enterprise network 115, such as a corporate intranet, that communicates with a public data network 117 (e.g., the global Internet). To appreciate the multi-user collaborative environment as provided by the system 101 for generating financial models for forecasting, a discussion of certain identified shortcomings of the traditional spreadsheet capabilities is in order.

Because of the way spreadsheets developed and evolved, they have a number of notable problems when used in the context of corporate decision making. The first set of problems is caused by the fact that spreadsheets are stored as documents. That is, individual files on individual hard drives. Specifically, the document storage method causes problems of accessibility, accountability, and auditability, as well as data collection and data publishing. Accessibility involves the ability of users to retrieve the data if they are authorized to access it. For example, the Chief Financial Officer (CFO) of a corporation is generally authorized to see all spreadsheets at that corporation, but if that spreadsheet is on a hard drive on a computer across the country that is turned off at 5 p.m., or on a laptop at the home of an employee who is on vacation, then that CFO simply cannot access that spreadsheet until a person is available to intervene. Thus, accessibility of spreadsheets is poor.

In terms of accountability, which relates to data only being viewed or changed by the person authorized to do so, spreadsheets are also lacking. To a certain extent, some organizations have developed ad hoc methods to address this concern. With respect to viewing restrictions, for example, one traditional approach is to only e-mail spreadsheets to users who the sender believes are authorized to view the data. The key weakness of this policy is that the sender has to know the list of users who are authorized to view the spreadsheet. Each additional person who receives a spreadsheet reduces the level of accountability through potential error or malice. Different corporate cultures have varying degrees of secrecy compartmentalization, and employees become acculturated to the rules of their particular environment, but relying on this to secure data is not a terribly rigorous method of accountability.

Furthermore, in general, spreadsheets are models created by one person who needs data from other users. If the spreadsheet is mailed to another person so that that person can enter data, then it is possible for that person to make alterations to other parts of the spreadsheet, for example, underlying formulas. To guard against potential illegitimate changes to the spreadsheet, the sender would need, for example, to copy the data of interest back into their original copy, rather than simply using the document sent back. Some spreadsheets possess a feature that allows locking cells. By applying a password to the document, only unlocked cells can be modified. However, only one set of cells may be marked unlocked. If several individuals are to contribute to a spreadsheet, there is no way to specify which individuals are allowed to change which cells. Also, password cracking programs for spreadsheets are easily obtainable on the Internet, so this approach is not failsafe against malice. Clearly, accountability of spreadsheet data is poor.

While accountability relates to restricting access based on authorization, auditability involves determining who made what changes when (and "who knew what when". Spreadsheets are updated constantly over their lifetimes, with new assumptions and new views and new formulas. By default, spreadsheets just save the changes directly over the previous version. Saving old versions is a purely manual process on the part of the user. When the user deems it important to save an old version, they typically adjust the filename accordingly, by adding a date, or a version number. Therefore, it is difficult to determine which user has made a change to a spreadsheet, and generally, only the date and time of the most recent change can be determined by looking at the time stamp on the file itself; the time stamp can also be readily altered. For instance, if a CFO wants to know the answer to a regulator's query ("What were your business forecasts and models indicating on the last day of the $4^{th}$ Quarter?"), then the CFO is generally faced with a forensic reconstruction process. This may entail a tedious multi-week process of having experts examine corporate back up tapes for evidence of what was on hard disks on a certain date. It is noted that many corporations do not back up all the local desktops, just their network servers. Despite the painstaking nature of such a task of reconstruction from an auditing standpoint, the CFO cannot deny that the request is unreasonable. Another problem related to auditability is the issue of trustworthiness. On the one hand, spreadsheets typically go through a development process which includes creating formulas. However, these formulas are not typically locked when data inputs are being entered, and it is easy for users to inadvertently overwrite a formula. Consequently, verifying the correctness of a spreadsheet can be problematic. It is noted that there are two aspects to the problem of correctness. The first aspect relates to whether the spreadsheet has been damaged—inadvertently or otherwise. The second aspect pertains to whether the spreadsheet correctly models what it purports to model. There have been some efforts to address the first concern. For example, some spreadsheets possess "auditing" tools, which help the user visualize how the formulas are related by illustrating with arrows on the screen between the cells. The drawback with this is that only the original creator of the spreadsheet really knows whether the original intent is intact.

It is noted that a traditional spreadsheet programs (e.g., Microsoft® Excel) permit concurrent updates by multiple users, but this is done without reasonable controls on accountability and without discovery and notification services. Such programs basically permit multiple users to work on the spreadsheet simultaneously, by effectively connecting each person's keyboard and mouse to the same document. One drawback thus is that the feature is not designed to work asynchronously, like e-mail, wherein each user can respond on his/her own schedule. Another flaw is that each of the users who are granted access can make changes without accountability. The next shortcoming is that there is no central location to discover spreadsheets waiting for update. If a user is to respond to three different individuals requests for information, it is necessary to determine how to access each different computer over the corporate local area network (LAN) using the spreadsheet program, and these individuals would have to leave the document and program open until the user responded. The only way for one person to notify another person of a request for data would be via another channel (i.e., e-mail or a telephone call).

From the above discussion, it is observed that the document model of spreadsheets possesses many drawbacks with respect to accessibility, accountability, and auditability. Moreover, this document model also has shortcomings in terms of data collection and updating, as explained below.

As mentioned earlier, the document model is inefficient from the perspective of collecting data and updating the models with the latest information. For example, if a spreadsheet has cells that need to be entered by three different users, the creator of the spreadsheet has typically only two options. The first option is to send the spreadsheet to each of the three users, and have them fill in the result and e-mail it back. Thereafter, the sender has to integrate the three responses. In the second option, each recipient could be asked to route to the following recipient in sequential order; however, this is likely to introduce a bottleneck problem. By way of example, if the first recipient is out of the office, the second and third recipients cannot provide their inputs, thereby collectively delaying the process. Another aspect of this problem is that there is no effective way to indicate a continuing interest in a set of data. Each user that has ever been asked for data could conceivably keep a list of data provided to others, and each time that data changed (for example, raw material costs), volunteer that information to the original requester. However, there is no way of knowing whether the original requestor still seeks the input, or has that responsibility.

Additionally, reliable and automated data publishing is very difficult with spreadsheets. Assume that a spreadsheet is utilized with the standard overhead factor per employee, the cost of capital, and the loaded cost per square foot of office space that should be shared with all analysts. Despite the presence of inter-document linking as a feature in most spreadsheets, there is no mechanism to link spreadsheets located on different computers effectively. The spreadsheet could be e-mailed to everyone, but if different users are authorized to see different data, multiple mailing lists have to be maintained. Inter-document linking is very fragile, as it depends on the consistent directory structures, which themselves are largely set up as a matter of user's personal preference.

The Forecast and Modeling system 101 of FIG. 1 addresses the above problems by capturing evolving information within the enterprise about projected financial performance and resource allocation options. The Forecast and Modeling system 101 can retain, for example, the entire history of the model building process, thereby enabling auditing and analysis of historical plans and business information. With a corporate wide approach, the Forecast and Modeling system 101 facilitates the collection and analysis of uncertain data and subjective data. The data collected by the Forecast and Modeling system 101 can be stored in database 119, which in an exemplary embodiment, is relational system.

The system 101 also provides decision makers with decision trees and simulation to rapidly generate and compare alternative scenarios. As a result, analysis and optimization of multiple decisions involving complex trade-offs can be readily executed. Such functions can be provided to the hosts 109, 111, 113 through one or more servers 121.

The Forecast and Modeling system 101, as will be more fully described later, can provide a mechanism for analyzing competitor moves and counter-moves through a multi-entity modeling and war-gaming process. Further, the Forecast and Modeling system 101 enables the building of re-usable financial components.

The Forecast and Modeling system 101 advantageously provides the above functions, while ensuring high levels of accessibility, accountability, and auditing support.

In addition, the Forecast and Modeling system 101 can be used for budgeting in a manner that provides for collection or analysis of fuzzy data, and links budget data to decisions or resources or financial models. By contrast, conventional budgeting software cannot support these capabilities. The conventional budgeting software aggregates data that have generally been estimated or computed externally. For example, such budgeting software enables a CFO to create a list of departments, each with a category for employee salaries, wherein each department head would enter their desired budget amount for salaries for the next fiscal year, perhaps broken down by quarter or month. However, under this conventional approach, the models used to create data are created externally to the budgeting program. The results of the models are transferred manually to the budgeting program.

The Forecast and Modeling system 101 can additionally support OLAP (Online Analytical Processing) in a manner that overcomes the conventional deployment of OLAP. For instance, OLAP, under the traditional implementation, is not designed to construct large scale business simulations, gather fuzzy data, or execute simulations. The Forecast and Modeling system 101 can construct a simulation which output results into an OLAP product for interactive analysis and reporting.

Traditionally, OLAP operates by converting data from transactional databases (i.e., point-of-sale and inventory data), and messaging the data in a format that allows for interactive querying of the data; such a format is denoted a "hyper-cube." Preparing a hyper-cube conventionally requires substantial advance planning. For example, data is transferred to the hyper-cube data structure nightly because the process is very data intensive. Typically, analysts will then study this data for trends or analyze the data profitability by category (e.g., what was our highest margin product in a certain location? What are same store profits compared to one year ago?)

The general operation of the Forecast and Modeling system 101 is explained below with respect to FIG. 2.

Figure 2:
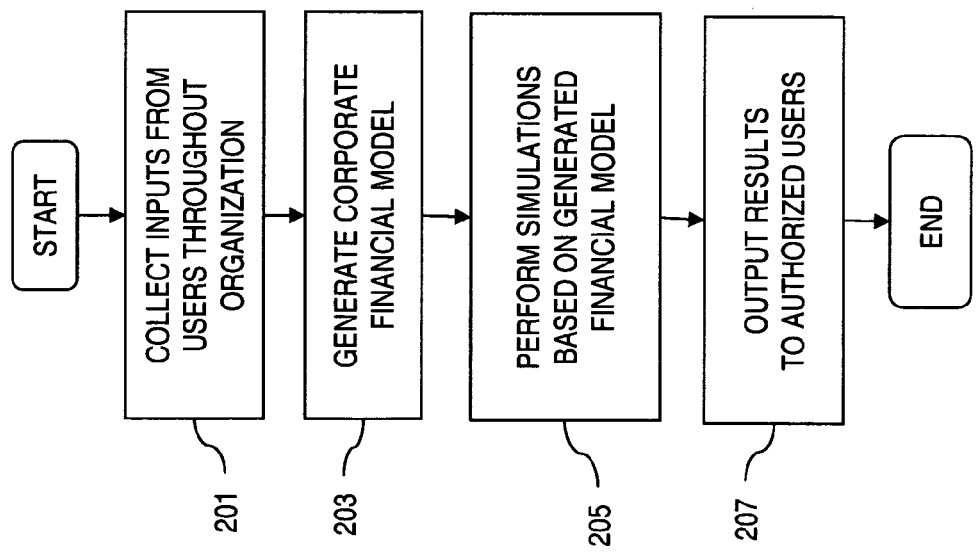
FIG. 2 is a flowchart of a process for generating a financial model using the forecasting and modeling system of FIG. 1.

FIG. 2 is a flowchart of a process for generating a financial model using the forecasting and modeling system of FIG. 1. As an enterprise wide financial modeling system, the system 100 can collect inputs (e.g., data, formulas, etc.) from various users throughout the organization, per step 201. Such inputs are used, as in step 203, to generate a corporate financial model that will serve to provide the most updated financial data for business planning and decision making. The generated financial model then undergoes various simulations according to the simulation framework detailed in FIG. 3 (step 205). Thereafter, the Forecast and Modeling system 101 can transmit the results to users who are authorized; such users are typically upper management within an organization.

Figure 3:
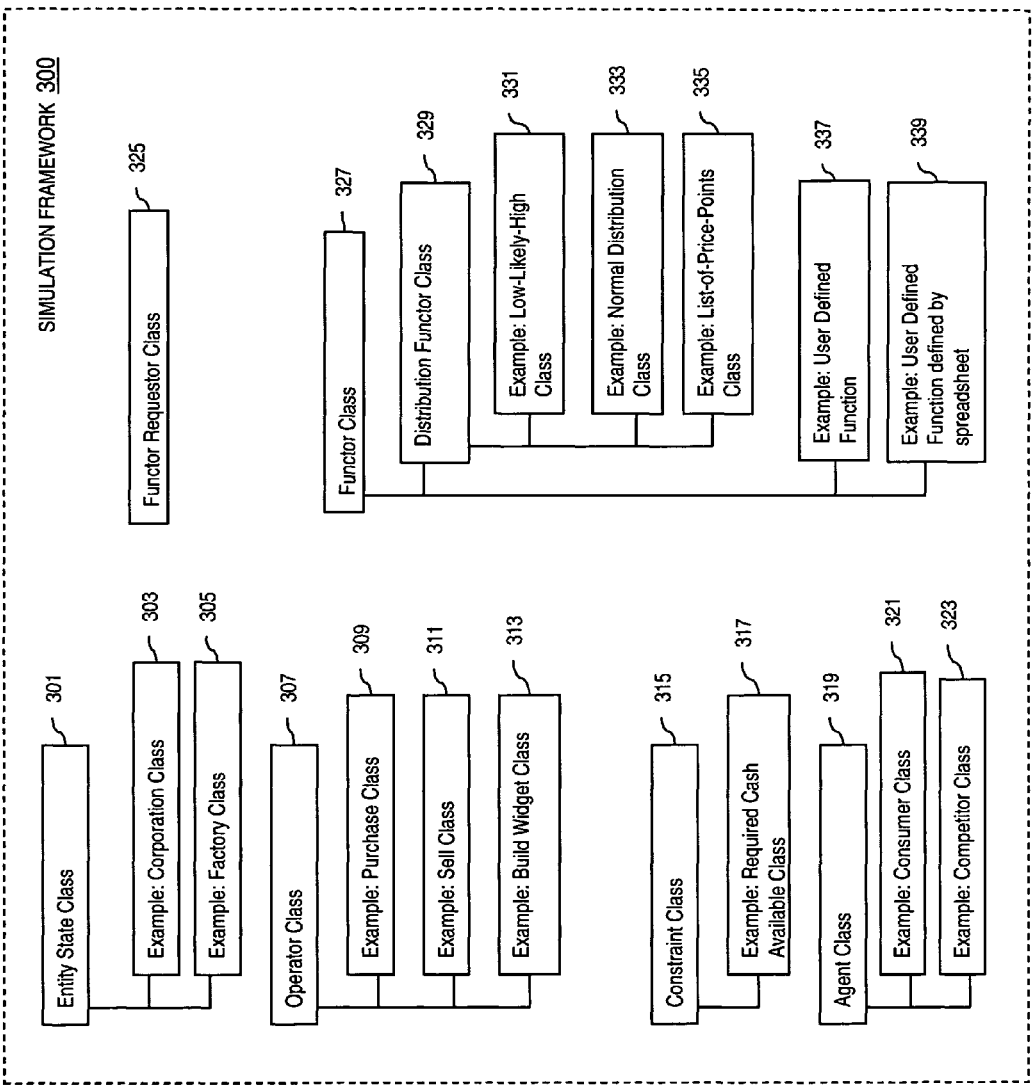
FIG. 3 is a diagram of a financial simulation framework supported by the forecasting and modeling system of FIG. 1, according to an embodiment of the present invention.
Figure 4:
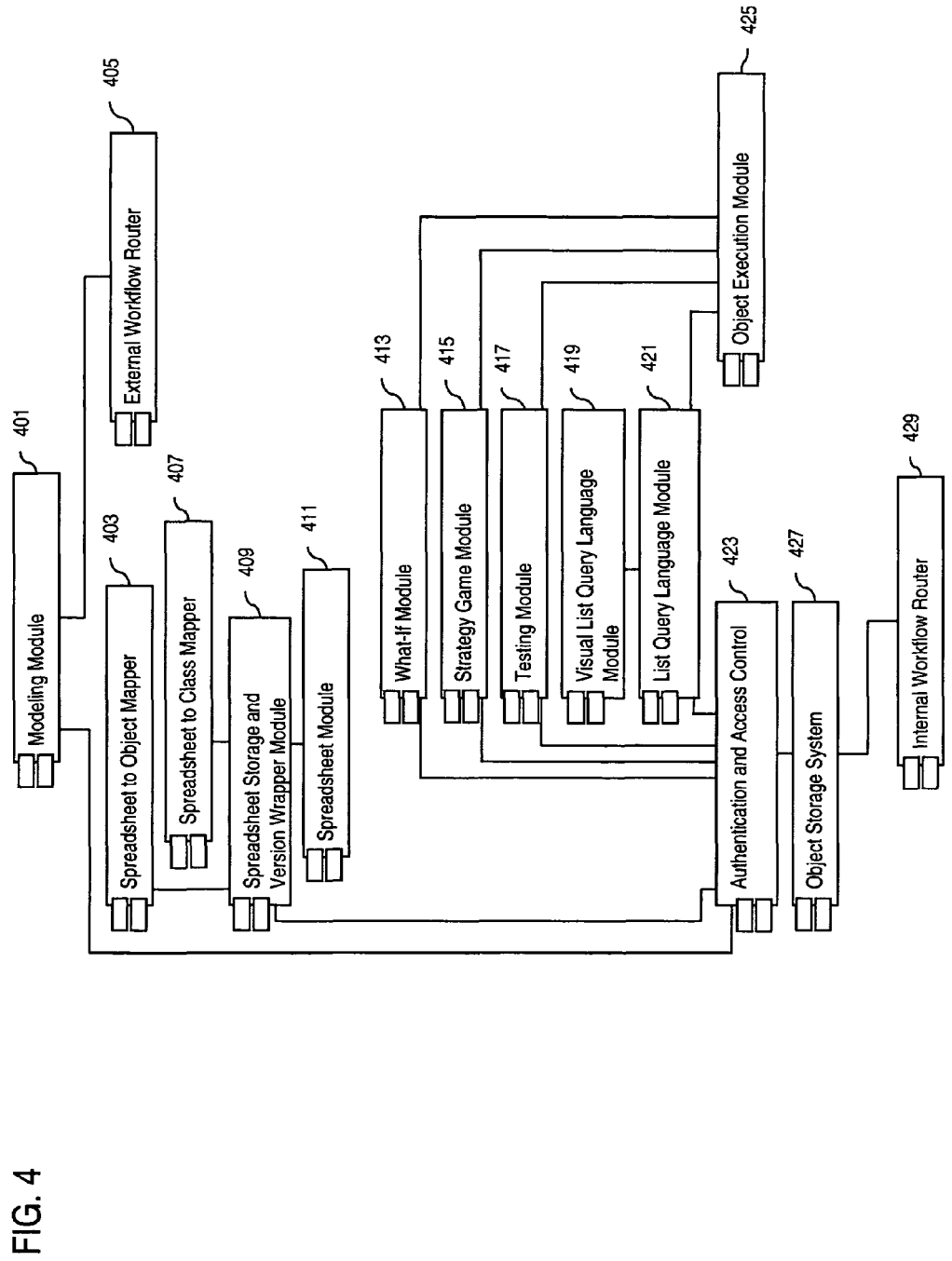
FIG. 4 is a diagram of a financial modeling components provided by the forecasting and modeling system of FIG. 1, according to an embodiment of the present invention.

FIGS. 3 and 4 show, respectively, diagrams of a financial simulation framework and financial modeling components supported by the forecasting and modeling system of FIG. 1. The Forecast and Modeling system 101 provides a Simulation Framework 300 that includes a variety of classes. The term "class" refers to a variable template and methods used to create and manipulate objects. Objects are collections of variables which can be acted on by methods. Objects are also sometimes referred to as instances. These terms should be taken to have the union of the meanings as commonly defined by the programming languages C++, Java, or Python. It is noted that in C++, methods are called member functions. The term class as used herein also includes the concept of interface. An interface is a class which exposes only methods, and not variables. This definition is consistent with the terminologies adopted by Java or the Microsoft® Component Object Model (COM).

It is noted that all object-oriented programming techniques are reducible to procedural programming techniques or in general to any technique which is Turing machine equivalent. For example, the term class can be read as "a data structure and all of the functions that operate directly on it."

The Forecast and Modeling system 101 is described using object-oriented concepts and terminology to indicate one embodiment of the present invention, although it is contemplated that the functions of the Forecast and Modeling system 101 can be implemented using other architectures.

To appreciate the modeling features as provided by the Forecast and Modeling system 101 for generating financial models for forecasting, a discussion of certain identified shortcomings of the traditional spreadsheet capabilities is in order.

For instance, it is recognized that spreadsheets have difficulty with two types of modeling: probabilistic and iterative. Decision trees and resource dependence are also difficult to model. Spreadsheets have no facilities for re-using models, aggregating models, and re-using summary models. Spreadsheets are adequate for building a model that relates input variables to output variables. However, when forecasting, there is often little confidence in the inputs. Each input to a model may need to be a range of numbers. For example, raw material prices may range from $1/lb to $2/lb. There may be a belief about the most likely amount, say $1.52/lb. Transportation costs may range from $0.20/lb (rail) to $3/lb (air). These ranges, under certain scenarios, are considered relatively "accurate"; while under other conditions, these same ranges are characterized as "fuzzy." It is noted that both of these terms apply equally well. The "accuracy" in this case may appear to have a counter-intuitive meaning. For example, if it is anticipated that the yield on the 10 Year T-Bond next year will be 5.5%, then that value can be characterized as precise. However, it might be more accurate to say that the yield will be between 4% and 6%, with a confidence level of 95%. The term "fuzzy" data can be intuitively easier to understand in this context. Because the future is unknown, "fuzzy" may often be a more accurate answer than an arbitrarily precise answer.

Because spreadsheets require tedious duplication of formulas or entire documents to model each alternative scenario, such painstaking approach encourages spreadsheet builders to discard ranges of numbers and just consider the mid-point. Spreadsheet users accordingly would have to perform substantial extra work just to consider the options "low, likely, high" on a single input variable. However, each input variable which has a range of potential values contributes to an exponential increase in the number of outcomes that must be considered; as few as ten input variables that span a range could result in a thousand potential outcomes. Using a non-linear solver to maximize or minimize values of interest (e.g., profit) is one approach to this problem. Another approach is to use a Monte-Carlo simulation to estimate the most probable outcome based on probabilistic inputs.

Probabilistic inputs expressed as ranges are just one consideration. Probabilities can be characterized by distributions, confidence intervals, triangles, or even discrete values. For example, a variable could have a value of 7.5 with an expected standard deviation of 2.5. The value could be from 5 to 10 with an 80% confidence factor. The value could be 5 to 10, but likely 7. The value could be $9.95, $14.95, or $19.95, but no values in between.

It is also recognized that a systematic mechanism to collect more accurate estimates is needed to feed into tools that support analysis of probabilistic models. Typically, what happens with current tools is that a person who is asked to provide a cost estimate, will provide an average of recent costs. However, it is extremely valuable for an analyst to actually collect enough recent costs to be able to characterize the statistical distribution of those costs. This will allow the analyst to use more advanced tools to derive more accurate forecasts. For example, a Chief Executive Officer (CEO) might be told that first year manufacturing costs for a new product will be $100 million. But the CEO's decision may be very different if the estimate is $100 million plus or minus $50 million, or $100 million plus or minus $5 million. This is the benefit of collecting and analyzing probabilistic or fuzzy data.

Another drawback with spreadsheets is that they do have features that allow a model to be evaluated over a range of input values. Some spreadsheets possess "data-tables" and "scenarios," which could be considered attempts to address this problem. However, data tables are limited to two input variables maximum. Scenarios enable sets of inputs to be saved and retrieved as a group. However, scenarios do not assist in analyzing or creating the permutations that are inherent in multiple independent variables. For example, if the raw material price and shipping price extremes are considered as given above, there are four scenarios. Each additional input variable that extends over a range at least doubles the number of scenarios, so that 20 input variables with ranges result in over a million possible scenarios to consider. There is at least one $3^{rd}$ party product which addresses these shortcomings from an analytical perspective, but not necessarily from a usability perspective. Another major drawback of scenarios is that only one is loaded at a time, making comparisons difficult.

The next problem with the way spreadsheets work is the fact that they cannot represent iterative processes. In general, iteration can be defined as the ability to feed the outputs of a calculation back into the inputs, usually, but not always, with finite termination criteria. If one attempts to do this directly in a spreadsheet, the spreadsheet will immediately warn the user, requiring the user to fix the formulas. Some spreadsheets do allow iteration, but an extremely limited form of it. This form of iteration is designed to determine if a set of formulas converge to a stable result. The spreadsheet stops calculating after an arbitrary definition of stability is met, or an arbitrary number of iterations has completed. This very limited form of iteration does not allow all the intervening data to be captured; this is akin to running a business simulation, whereby only the profit figure for Year 10 is provided, because all data for Years 1 through 9 are discarded.

The way that spreadsheet users handle the need for iteration is termed 'loop-unrolling." Programmers only unroll loops by hand in very rare situations. Normally, it is an optimization performed by a compiler. Spreadsheet users, however, always have to unroll loops manually because they must always choose in advance the number of iterations they wish to perform. For example, if they seek to simulate profitability from 0 units to 10,000 units in increments of 100, a spreadsheet user will need to create a series of 100 values, all stored simultaneously in a row or column of cells. The user can feed the results of each iteration into the next step. By using what spreadsheets call "relative cell references", and a command to make a series, this process is somewhat simplified. However, a copy of the formulas is made for each step of the iteration. This causes two key problems for spreadsheet iteration. The first problem is that termination criteria cannot vary depending on input cells. The second problem is that maintenance is greatly complicated. If the formulas change, they must be re-copied to all of the "unrolled" locations. Also, if the user wishes to change the number of iterations, or the starting and ending numbers, then the "unrolled" loop must be expanded or contracted. It is highly probable that expansion or contraction will break other spreadsheet formulas that relied on the pre-specified length of iteration.

Moreover, spreadsheet cells have very restricted capabilities compared to traditional programming language variables. A spreadsheet variable can only have a value or formula assigned to it once, when the model is constructed. This is in contrast to procedural programming languages, in which a variable can be altered by statements in different locations. In other words, a spreadsheet formula always fully describes the method of computing the value in a cell, whereas a variable can accumulate changes from different sources. The latter approach is much more powerful, as it allows changing states to be tracked over an arbitrary number of iterations. Such an approach also permits source code to be aligned more closely to the underlying model. For example, many actions can cause a bank balance to decrease. Forcing the formula for bank balance to a priori refer to all actions that could affect it is simply unmaintainable. Using traditional formulas, the bank balance formula must be edited each time a new expense is integrated into the simulation.

However, it is noted that iteration constructs used in traditional programming languages can be difficult for non-programmers, because data structures for capturing intermediate data values can be confusing and tend to require additional steps to use. Data structures or objects must be created to capture intermediate computations. After computations are performed, these data structures or objects must then be summarized or displayed, requiring additional iteration to be set up.

Iteration is essential for building simulations. In fact, all business activity is iterative, with each business action building on the resources acquired and expended in the previous time period. When using iteration for simulation, an additional complexity is introduced. Simulations very often involve simulating actions occurring at the same time, or in parallel. If simulations of two factories are occurring in parallel, and Factory B consumes the output of Factory A, then clearly the simulation must in some way alternate between Factory A and B because of that relationship. It is recognized that there is a need for some method to be used for scheduling iteration that is used for simulation.

Without iteration, it is impossible to build dynamic simulations, and without dynamic simulations, building a realistic model of business activity would be extremely difficult.

As noted, business organizations are constantly faced with decisions. Modeling a decision means that one or more of several courses of action can be taken—subject to resource constraints. Such decisions can involve determining whether to buy a company, to introduce a new product, to build a new factory, or to launch a new marketing campaign; these decision making processes can be modeled. Each decision can be analyzed independently, to the extent that it does not depend on the others. How does someone analyze all the possible outcomes of all permutations? What if some outcomes cause an increase in debt level and the company has loan covenants regarding indebtedness? If several decisions cause debt increases to all occur at the same time, such an analysis is manageable. However, if the debts and cash flows ebb and flow over a period of years depending on the sequencing and timing of decisions, then examining all the permutations may be quite necessary. In a probabilistic model, each decision can be modeled as a discrete set of choices: 0 for "no," 1 for "yes." However, as discussed, spreadsheets do not handle probabilistic models adequately.

Accordingly, the use of decisions trees is another limitation of spreadsheets. Resource dependence is related to decision trees, in which certain decisions affect the validity of other decisions. For example, building a factory is a precursor to selling products built by that factory. If a business simulation is examining the branch of the decision tree where the factory is not built, then it certainly should not include the branch where the factory is creating revenue generating products. Understanding decision trees and resource dependence are every day occurrences in the business world, but spreadsheets do not provide any assistance in modeling using these types of constraints.

Once a useful model is built in a spreadsheet, it can be surprisingly difficult to re-use. Re-use of computer software code has been a primary goal for improving productivity of computer programmers for decades, and huge strides have been made in this area. Computer programmers have at their disposal a wide range of resources and techniques that enable them to re-use the efforts of others, rather than re-invent from scratch. Examples include code libraries, object oriented programming languages, and source code repositories. None of the facilities that programmers have available to them are available to spreadsheet analysts. Programming language theorists and working programmers had to invest substantial effort into designing facilities that would enable costly-to-create computer code to be re-used. No similar effort has been made to benefit spreadsheet analysts.

Spreadsheet re-use is difficult for a number of reasons. The first observation is that spreadsheets simply have never been designed with that goal in mind. One explanation for this is that spreadsheets link to each other in a way analogous to how the original programming languages shared data between modules: ad-hoc variable by variable, with no checking or assurances that modules updated over time are still referring to the same inputs. To be as clear as possible about this glaring deficiency, spreadsheets allow inter-spreadsheet linking to be done by referring to a specific row and column. In computer programming terms, this is analogous to specifying a specific location in memory to hold shared data. It is untenable, because maintenance of a spreadsheet very commonly involves adding and deleting rows and columns. Linking by numeric reference rather than by name is a technique that has been abandoned by computer programmers long ago, but spreadsheets encourage the practice. This is nearly moot since inter-spreadsheet linking is unreliable for other reasons. The inter-spreadsheet linking method depends on local hard drive paths—it completely breaks down inter-machine.

The second reason that re-use is difficult stems from the fact that there is no separation between the model and its usage without duplicating the entire model. In computer programming terms, there is no way to treat a portion of a spreadsheet model as an instance of a class. Duplication of code is bad because it creates a maintenance problem. Each duplication must be touched when the model requires maintenance. This can be a problem both in sharing models and aggregating models. Each time a function refers to different inputs, that function must be duplicated. Alternatively, the function could be recreated within the macro language; but then intermediate computations are no longer visible. Scenarios are no help, since they cannot be called or created by spreadsheet formulas. As stated earlier, scenarios are severely limited by their ability to only load one alternative at a time.

For example, it is assumed that a model of how a retail company will roll out stores across the U.S. is created, and that a model which accurately reflects the way a store location is built and launched. The variables are the number of employees per store, the square footage of each store, the rent for each store, the date of ground breaking, and the date of grand opening. Now, it is necessary to define 50 stores and create a cash flow statement for this information, using traditional spreadsheet techniques; the model has to be duplicated 50 times. In addition, it is necessary to determine how to create a cash flow statement that is rolled up from those 50 copies.

Under another scenario, an analyst builds a single store model, handing the model off to six project managers to create a copy for each store they are in charge of building. The analyst later discovers an error and makes some improvements to the model. There is simply no way to update all the models that were copied from the source model. Project managers who used the model have to be notified of the error and manually fix their copies.

This leads to the third re-use problem—that of aggregation. Using traditional techniques, each time a store is added or deleted, the cash flow statement model has to be updated. However, there should be no need to so. The cash flow model should not depend on the number of stores that it models, it should just work for however many stores are dumped into it. Changing the number of spreadsheets which feed into a summary model should not require adjustments to the summary model. At least, there is no good reason to do that from a software engineering perspective, as it results in increased maintenance costs and increased potential for errors.

Generalizing from this, summary models built using traditional spreadsheet formulas cannot be re-used with different inputs without requiring duplication of the spreadsheet for the new context and extensive updating of formulas. In contrast, cost accounting software can produce profitability reports for different products without re-coding of the software for each product reported on. Once a profit-and-loss statement has been programmed, it should not be necessary to duplicate it and update most of the formulas each time a different product needs to be analyzed. Yet, this is the situation encountered when using spreadsheets to create summary reports.

Both of the previous two issues are caused by the fact that summary models are composed of many (perhaps hundreds) of formulas that may refer to the input data. All of those formulas must be updated in order to summarize something else. Writing formulas that are sophisticated enough to parametrically vary what they are summarizing requires not only advanced functions, it results in extremely long formulas which are difficult to comprehend, and therefore difficult to audit and maintain. Even if summary formulas are parameterized, the entire summary model must be duplicated to view more than one summary at a time. Even then, writing such formulas requires perfect foresight, or perfect rigidity in what is selected for summarization.

Finally, once data has been summarized, validating the source of the data is extremely tedious. The values are shown, but the formulas can only be examined one by one. The method of using arrows on the grid to point to predecessor formulas would not work for a balance sheet containing hundreds of accounts, and in addition, the arrow technique does not work for inter-spreadsheet references.

The Forecast and Modeling system 101 addresses the above problems by using the Simulation Framework 300 to build models that provide for capturing accurate inputs, robust and clear semantics of model objects, and re-usable, verifiable reporting built on a flexible list query language.

According to an embodiment of the present invention, the Simulation Framework 300 includes the following classes: Entity State classes 301 that model the state of entities, Operator classes 307 that model sequences of actions or processes, Constraint classes 315 that determine when operators objects are valid to apply, Agent classes 319 that trigger application of operator objects when conditions specified by the agent are met, Functor classes 327 that encapsulate and standardize the interface of user defined functions, Functor Requestor classes 325, and Distribution Functor classes 329.

The Forecast and Modeling system 101 can interface with conventional spreadsheets. To accomplish this effectively, the system 101 includes a spreadsheet program 411 that can be controlled by an external program. Dynamic user-specified workflow routing 405, 429 is also provided by the system 101. The Forecast and Modeling system 101 also has a secure distributed object storage system 427 that can be accessed on the local computer or accessed by multiple concurrent users via a network protocol. The Forecast and Modeling system 101 additionally includes, in an exemplary embodiment, the following components: Spreadsheet-to-Object Mapper 403, Spreadsheet-to-Class Mapper 407, Spreadsheet Storage and Version Wrapper 409, Object Execution Module 425, Modeling Module 401, What-If Module 413, Strategy Game Module 415, Testing Module 417, Visual List Query Language Module 419, and Verification Feature for Visual List Queries (not shown), and List Query Language Module 421.

The Forecast and Modeling system 101, in an exemplary embodiment, makes the above modules and classes accessible via a graphical user interface that presents the available options and commands for each module.

Returning to the discussion of the simulation framework 300, the names of classes are capitalized as in "the Functor class 325." References to objects created from those classes are lowercase as in "the functor object." The purpose of a simulation framework 300 is to abstract essential states and processes relevant for a target domain. The framework 300 provides a set of classes with pre-defined interrelationships that cooperate and assist in building a model.

For the purposes of simulating business models, the Forecast and Modeling system 101 classifies framework classes into broad categories. These categories include: (a) entity state classes 301, (b) operator classes 307, (c) constraint classes 315, (d) agent classes 319, (e) functor requestor classes 325, (g) functor classes 327. Collectively these classes are referred to as the simulation framework 300 or simulation classes 300. Each of these classes may have subclasses with additional functionality that is a superset of its base class' functionality.

Simulation classes 300 and objects that are created from simulation classes 300 are used, processed, or stored by every module.

Entity state classes 301 are used to create objects that model the state of entities. Examples of entity state classes 301 for the domain of business enterprises classes are Corporation class 303, Factory class 305, balance sheet, income statement, employee, supplier, customer, loan, asset, and store.

Operator classes 307 are used to create objects that model sequences of actions or processes. An action may be another operator. Decisions are modeled using operators. Typically, actions modify entity state objects. Operators may examine entity state objects and other state information such as the sequence of operators previously applied to determine what actions to take. Operators may take action based on multiple parameters. Operators are valid to execute if their pre-conditions are satisfied as indicated by an associated constraint class or internally specified constraints. Examples of operator classes 307 for the domain of business enterprises classes are Purchase class 309, Sell class 311, Build Widget class 313, borrow, invest, and hire.

Constraint classes 315 define pre-conditions on operators that determine whether an operator is valid to execute. For example, a Required Cash Available class 317 could provide a constraint on a purchase operator that would specify that there needs to be a large enough bank balance to fund the purchase.

Agent classes 319 model the expected decisions of external agents. An external agent is a person or entity that can make decisions to take action, possibly based on available data, and possibly to satisfy the goals of the agent. An agent class may examine entity states to determine whether to apply operators. Agents are allowed to examine their environment at intervals defined by the agent to determine whether the agent will apply one or more operators. Examples of agent classes include Consumer class 321 or Competitor class 323. It is also possible that a person creating models would classify employees, suppliers or customers as agent classes instead of entity state classes if the decision-making strategies of those parties could be modeled and would be relevant to the situation being modeled.

Functor classes 327 standardize the interface of user defined functions so that these functions can be incorporated into the simulation framework 300. Distribution Functor classes 329 are a subclass of Functors 327 and are discussed below.

A workflow router 405, 429 allows users to send and receive requests for data or programs. At a simple level, a mail server and mail routing system with mail clients is a workflow system. A workflow system enables the distribution and execution of programs by both sender and receiver in order to support Functor requestor classes 325 and Distribution Functor classes 329 and the associated program code that may be plugged into those classes by users. Programs can be represented as computer code in any form that can be executed by the sender or the recipient.

A workflow router 405, 429 can be implemented in a variety of ways. An internal workflow router 429, for example, could attach to an object storage system 427 and use the object storage system 427 as the storage needed for the workflow router 429. Another possibility is to use an external workflow router 405 by accessing it directly from the requesting program.

The Forecast and Modeling system 101 benefits from sharing programs and data securely between multiple users with the users possibly using a distributed network of computers to access such programs and data. The Forecast and Modeling system 101 is particularly useful when combined with an object storage system 427 that has many or all of the following attributes: an object storage proxy that allows clients to securely access a remote, shared object storage system; a hierarchical name space for storing programs and data;

enables programs and data to be persistent between invocations of programs that use the programs and data; automatic retention of earlier versions of objects; methods for retrieving only objects saved up to a specified time; enables programs and data to be shared by multiple concurrent users via a network protocol; enables authorized users to grant or deny security permissions via a network protocol on a per object basis; restricts access to objects based on security permissions and user authentication 423; allows authorized users to remotely add and remove users and privileges; and provides the ability to authenticate users using various methods.

A spreadsheet-to-object mapper 403 enables a user to map the contents of a spreadsheet into one or more objects. The resulting objects enable the actual or simulated reading and/or writing of the spreadsheet by using the object's methods. Specifically, the spreadsheet-to-object mapper 403 maps spreadsheet cells to objects. At least one class is required for mapping spreadsheet cells to objects of that class with methods providing read and write access to those cells. The class has variables that allow objects of that class to retain which cells of which spreadsheet are to be mapped to the object. In the case of multiple cells, a mapping to an object might result in an array equivalent that is accessed via index, or a map equivalent that is accessed via key, or other commonly useful data structures. These mapping classes may also have additional semantics, such as "these numbers represent cash flow" or "these numbers represent loan amounts." Alternatively the assignment of domain specific semantics can occur in a separate step.

The spreadsheet-to-object mapper 403 also includes a user interface that allows the user to create objects of selected mapping classes. Additionally, the user interface can permit the user to select objects for further actions, as well as map one or more cells on the spreadsheet to a selected object. Furthermore, the spreadsheet-to-object mapper 403 has an output generator that provides an object that captures the mapping created by the user. The mapper 403 provides a connection to a spreadsheet storage and version wrapper 409.

The advantage of a spreadsheet-to-object mapper 403 is that it enables spreadsheet users to add formulas to a simulation framework 300 without learning a programming language. The spreadsheet formulas and cell contents may be compiled into another format that provides the same functionality as that provided by the spreadsheet contents. This can be performed for such reasons as performance and/or convenience; for example, avoiding actual loading and changing of the spreadsheet for each object access. Viewing the spreadsheet may result in any deferred changes being applied if the user deems it useful.

The spreadsheet-to-object mapper 403 is one method of creating and parameterizing simulation classes 300. Other methods include graphical user interfaces that allow creation of objects and setting of parameters directly, or automated systems that create objects and set parameters by translating data from external data stores. An example of an automated system is the creation of a balance sheet object and setting its values by downloading data from an accounting system.

Conversely, a spreadsheet-to-class mapper 407 enables a user to map the contents of a spreadsheet into one or more classes. The resulting classes effectively duplicate the spreadsheet each time the class is used to create an object. The duplication of the spreadsheet may be accomplished by various means other than actual duplication, for example, compilation into another form, or virtualized re-use of the spreadsheet via sequential substitution of varying parameters. However, to the user of the class and its objects, the spreadsheet appears to have been duplicated. Certain methods, known as static methods, may access the original spreadsheet.

The spreadsheet-to-class mapper 407 can also include a spreadsheet-to-object mapper 403 as described above, with the modification that the output generator annotates the output data structure to indicate that the mapping is a map to a class (instead of an object). This distinction is used by the Object Execution Module 425.

Furthermore, the spreadsheet-to-class mapper 407 can be used to create new simulation classes or to subclass existing simulation classes 300.

An advantage of a spreadsheet-to-class mapper 407 is that it enables spreadsheet users to add re-usable formulas to a simulation framework 300 without learning a programming language.

An advantage of both spreadsheet-to-object mappers 403 and spreadsheet-to-class mappers 407 is that it enables spreadsheet users to benefit from the more sophisticated computational constructs such as iteration and re-use that are available to classes and objects written in a complete programming language. In addition, spreadsheet users benefit from the ability to access additional functionality without losing all the benefits of spreadsheet use.

Effectively, the mapping process is used to assign semantics to the contents of spreadsheets. For example, where a list of numbers in a spreadsheet may be labeled as "Cash Flow" in plain English, there are no additional semantics specific to Cash Flows that are available or enforced. Examples of such additional semantics would be an operation that calculates net present value or an operation that adds two cash flows. While it is evident that these operations can be performed directly on a spreadsheet, the key observation is that an automated process cannot perform these operations without customization to the exact context, because the semantics are only available in English, not in an unambiguous machine readable specification. In other words, any computation can be performed arbitrarily on any cell of a spreadsheet regardless of the intended semantics of that cell. For example, the net present value function could be applied to a list of shoe sizes, and a spreadsheet will continue to compute that non-sensical result. By mapping spreadsheet contents into a semantic context, higher level operations are enabled and semantic constraints are enforceable. In this regard, the Forecast and Modeling system 101 provides a substantial advance over conventional practices.

A spreadsheet storage and version wrapper 409 provides a mechanism that keeps spreadsheets properly associated with the various classes and objects that depend on the spreadsheet. The spreadsheet storage and version wrapper 409 also automatically maintains previous versions of spreadsheets that may still be referenced by execution contexts or for auditing purposes. The spreadsheet storage and version wrapper 409 is necessary when encapsulating spreadsheet programs 411 that are based on a traditional document paradigm and that normally allow the user to save and restore spreadsheets to the location of their own choosing.

According to an embodiment of the present invention, the spreadsheet storage and version wrapper 409 has the following functions. The wrapper 409 can support display of a spreadsheet user interface for use by a person, as well as opening and saving spreadsheet contents under program control. Additionally, the wrapper 409 extracts and inserts values, formulas, and other information from a spreadsheet under program control. The wrapper 409 can also retrieve spreadsheet data from a program specified location with a program specified identifier and program specified version number, and save spreadsheet data to a program specified location using a program specified identifier and program specified version number. Further, the wrapper 409 includes a delete function that does not allow regular users to delete spreadsheets that they have previously saved. The delete function is can be made available only to users who have logged on with an account that has a special administrator privilege for deletion. Lastly, the wrapper 409 supports functions that connect to an object storage system 427.

One advantage of the spreadsheet storage and version wrapper 409 is that it can be used to relieve a user of having to reliably follow rules for opening and saving spreadsheets in certain locations using manual methods in order to maintain synchronization with mappings to a simulation framework 300. At the same time, the spreadsheet storage and version wrapper 409 enables the spreadsheet user to continue using the interface and functionality that they are accustomed to, instead of being forced to rely on a completely different spreadsheet program that has the needed characteristics for reliable mapping to objects and classes.

The Functor Requestor class 325 encapsulates a request that can be routed through workflow systems 405, 429 to request the provision of a function in the form of a program and any associated data. These responses are denoted as Functors 327, which may include simple scalar data or complex functions expressed as a computer program with multiple input variables and complex effects on output state. By way of example, a Functor Requestor class 325 can include methods that allow a user identifier and associated routing information to specify a recipient of a request. For example, an e-mail address could be used as a method for identifying who to obtain information from. In addition, the Functor Requestor class 325 can include methods that allow a message payload to be specified that describes the purpose of the request. The Functor Requestor class 325 includes methods for storing program code and data provided by the sender that may be used to validate, limit, or provide context for the request, as well as methods for storing program code and data provided by the recipient in response to the request. The Functor Requestor class 325 can further include methods that allow the recipient to provide more than one simultaneously active response to a functor requestor, methods for executing program code provided by the sender or recipient, methods that allow the sender to mark the object visible or invisible to the recipient, and methods that support persistence and serialization that allow the object to be transmitted to another computer, updated, and sent back to the requestor.

The Functor Requestor class 325 provides a number of advantages. One advantage is that the class 325 enables users to dynamically create integration points in a simulation framework 300 that another user can asynchronously and repeatedly plug computer programs into. Another advantage of the Functor Requestor class 325 is that it can accept a Distribution Functor class 329 automatically, so that statistical distributions are not compressed into scalar values prior to execution of a simulation.

The Distribution Functor class 329 allows the return of user specified statistical distributions via a Functor Requestor 325. Specifically, the Distribution Functor class 329 can include methods that allow the specification of a distribution for this type of Distribution Functor class 329; examples include: a range of values; Low-Likely-High class 331; a curve specified as a calculated function, such as Normal Distribution class 333; a list of values or value ranges such as List-of-Price-Points class 335; a curve interpolated from samples—e.g., a curve generated by a person drawing with a computer mouse; and methods that allow the retrieval of a specified number of samples sufficient to characterize the distribution.

For instance, if three samples were requested, the lowest, most likely and highest values would be returned. If 100 samples were requested for a normal distribution, then 100 values consistent with that distribution would be returned. The Distribution Functor class 329 also includes methods that support persistence and serialization of objects that allow the object to be transmitted to another computer, updated, and sent back to the requestor. Further, the Distribution Functor class 329 provides an optional method that returns the number of samples necessary to provide a reasonable fit to the distribution represented.

The distributions functor class 329 advantageously enables to respond with an arbitrary statistical distribution in response to a functor request. By standardizing the interface for accepting statistical distributions, collection of such distributions and subsequent computation using such distributions can become pervasive, thus improving accuracy.

An object execution module 425 enables other modules to load objects created from the simulation framework 300, and under control of a calling module, apply sequences of operators. The results of these simulations are collected for either interactive or automated analysis. According to one embodiment of the present invention, the object execution module 425 includes methods that allow the creation of a plurality of execution contexts. An execution context is a collection of references to simulation classes and objects that the user has combined into a model. An execution context is also referred to herein as a scenario. The object execution module 425 also supports methods that apply valid operators, and methods that can return the current state of entities, and the sequence of operators which have been applied and other objects and results of execution.

Additionally, the object execution module 425 includes an execution engine that can execute the methods of objects and that can pause execution and allow access to all objects and classes currently in use in a specified context. The object execution module 425 can also include an execution engine that processes agent objects as specified by the agent objects. Optionally, for use by a list query language 421, the execution environment retains the values of all assignments to all variables, treating each variable as a list, and each assignment as an addition to that list. The object execution module 425 can also include a user interface that can show the current state of entities, and the sequence of operators which have been applied. For example, the user interface could show a balance sheet and show the sequence in which the "add new retail location" and "hire employees" operators were applied. Further, the module 425 can include a comparison module which can show the user the variation in entity states over the course of a sequence of operator applications and can show the user variation in entity states from a plurality of execution contexts. For example, one execution context could be used to simulate business-as-usual for the next three years, while another execution context could simulate building two new factories and increasing output over the same time period. In this example, the comparison module could allow a comparison of balance sheets and income statements over that time period.

One advantage of the object execution module 425 is that it provides for an examination of the sequence of applied operators led to a state. Another advantage is the ability to compare entities in different execution contexts after application of operators.

If any objects in the simulation provide results from distribution functors 329, then the object execution engine can execute the simulation multiple times using Monte-Carlo simulation techniques. Statistical aggregation operators such as median, average, and standard deviation can be used to analyze the results of multiple, perhaps hundreds or thousands, of simulations with varying starting parameters. To save memory, the user may specify in advance which variables are of interest, and only these variables need to be saved over the hundreds or thousands of executions that may be needed.

Because some operators may have random effects, re-running a sequence of operators is not guaranteed to result in the same outcome. Depending on available storage and usage of compression techniques, in many cases it is possible to store every change to every entity in the simulation, thus allowing examination of entity states at any time point in the simulation.

As seen in FIG. 4, the modeling module 401 allows the creation, editing and management of simulation objects. The modeling module 401 may accomplish this by allowing the creation of objects from existing classes, or the creation of new classes and objects. Further, the modeling module 401 allows users to request models and data from other users. In particular, the modeling module 401 can include the following: definitions of simulation classes 300 such as Entity State classes 301, Operator classes 307, Constraint classes 315, and Agent classes 319; a user interface that allows object variables to be set; a user interface that allows existing classes to be selected and objects to be instantiated therefrom; and, a user interface that allows objects to be linked, as allowed by their interface methods and object variables. Additionally, the modeling module 401 includes methods that can send functor requestor objects to a workflow router 405, 429; a user interface that allows object security permissions to be edited; an optional connection to a spreadsheet storage and version wrapper 409; a connection to an object execution module 425; and a connection to an object storage system 427.

The modeling module 401 advantageously enables multiple users, at different times and at different places, to collaborate on building a large collection of classes and objects that can be combined into executable models of business activity.

Because the model is built by requesting and responding to interfaces accepted by Functor Requestors 325, users do not have to disclose the implementation details of their portion of the model to any other users. By locating an object execution module 425 on a remote secured computer different from the computer running the modeling module, it is even possible to ensure a high degree of security for the Functors 327 provided by other users by executing such Functors 327 on a computer not physically accessible to a user of the modeling module 401. This is more secure because physical access to a computer generally implies that the computer is not secure from tampering.

The purpose of the what-if module 413 is to enable a user to select from previously created simulation objects, and interactively apply sequences of operators to explore the effects of those operator sequences. The what-if module 413 can include methods for creating and naming new scenarios, and methods of copying simulation objects into a scenario. Also, the module 413 can provide a user interface that enables the user to select valid operators to apply to entities, a connection to an object execution module 425, and a connection to an object storage system 427.

The simulation framework 300, according to an exemplary embodiment, has a strategy game module 415 that facilitates multi-player "gaming" of competitive scenarios to establish possible outcomes. Specifically, the strategy game module 415 can include methods for creating and naming new scenarios; and methods of copying simulation objects into a scenario. Such methods may be used before or during the game simulation. Also, the module 415 includes methods for adding teams to scenarios, methods of assigning individuals to teams; methods for assigning entities and their states to teams; and methods for assigning the goal of each team. Teams may be assigned different goals. For example, Team A may be tasked with maximizing market share of Entity A. Team B may be tasked with maximizing after-tax profitability of Entity B. Further, the strategy game module 415 supports methods for assigning a start time to the game and the standard time step for the game, and processes for notifying all teams that all teams have selected one or more game operators which is called a move, or have forfeit their move. The module 415 also includes processes for notifying each team what operators are valid for selection by the team in the next time step; processes for accepting the team's selection of operators for the next time step; a connection to an object execution module 425; and a connection to an object storage system 427.

The strategy game module 415 advantageously allows introduction of new entity states 301, additions to existing entity states, and introductions of new operators 307 at any time during game play. Effectively, this allows the rules of the game to be expanded or altered on each game move. In a normal competitive game, this would be considered an inducement to award one's team with infinite power. However, the purpose of the strategy game module 415 is to allow teams to hypothesize about how others might behave. Generally, individuals on the teams for a given strategy game scenario would all be employees of a single company. Some employees would take on the role of their competitors. The goal at the end of the game is then to evaluate as a group whether the newly introduced states and operators were plausible modifications of the starting environment.

For example, a scenario may be set up initially with the states of three entities representing three publicly traded companies, called A, B and C. Teams are set up to represent the managements of companies A, B, and C. Companies A and B are competing in a hostile takeover of C. It may be that after a few simulated time steps of the game, that a member of team B introduces a new entity, which represents the employees of Company C. Team B also introduces a new operator, which represents the cessation of production at Company C due to employee walkout. Team C may respond by introducing a new entity Company D. Company D may be characterized as a "white-knight" which Company C would prefer to be acquired by. Team A may respond by introducing an operator which represents a change in tax law which favors the transaction proposed by Team A. By introducing the novel idea in computer role playing of allowing arbitrary changes to the game state and the game operators, the beneficial effect of considering and introducing other plausible options is encouraged. The real purpose of the strategy gaming is to generate plausible scenarios that might not otherwise have been considered by attempting to set all game states and operators a priori.

Another significant benefit of the war-game module 415 is that it allows many members of the management team to participate from distributed locations (e.g., offices 103, 105, 107). Another potential benefit is allowing operational managers to participate regularly in strategy games with small time commitments each day. This can be implemented by setting the strategy game module 415 to advance the simulation time step only twice a week, for example, or only once all teams have completed their previous move.

A testing module 417 serves two purposes: (1) to locate errors in the way constraints are described on a simulation, and (2) to identify possibly viable strategies that improve parameters of interest, such as profit. The testing module 417 can include methods for creating and naming new scenarios, methods of copying simulation objects into a scenario, and methods for defining agent proxies. An agent proxy can use specified operators on entities it controls. Also, the testing module 417 includes methods for assigning allowed operators and controlled entities to agent proxies, and methods for assigning an objective function and goal to each agent proxy. An objective function is a function of entity states that measures an agent's success. A goal is a specific value, including without limitation, negative infinity, zero or positive infinity. An example of an objective function would be after-tax profit, and a goal would be to maximize after-tax profit by making it as close to positive infinity as possible. An objective function does not have to be based on the state of entities controlled by the agent. The agent may be expected to indirectly affect the state of non-controlled entities.

The testing module 417 additionally possesses an agent generation method for creating programmed agent strategies that on average is likely to improve an agent's probability of improving its objective function. An example of such a method would be a genetic algorithm that deletes the least successful agents, and creates new agents by combining parts of the most successful agents, possibly with mutations. The module 417 also has a method that executes the following simulation process: creates a copy of the initial state; for each agent proxy, creates a matching agent with a programmed strategy for selecting a sequence of valid entity operators; executes the simulation over a specified interval of time with specified termination conditions; records the sequence of operators chosen by each agent and the value of the objective function for each agent after each simulation time step; invokes an agent generation method as described above—that is, replace the pool of agents with a new pool of agents likely to improve on the earlier agents' objective functions; and continues the simulation process until a specified termination condition is met.

Further, the testing module 417 has a graphical user interface that allows the testing process to be set up and that allows the results of the testing process to be examined. The module 417 includes a connection to the object execution module 425, and the object storage system 427.

At the end of the simulation process, the user can select from a number of interesting results to examine, for example, the top ten agents that came closest to satisfying their goals. It is likely that most agents will have achieved their goals by exploiting errors in the constraints on operators. For example, an agent may succeed in maximizing profit because no precondition was set on the build factory operator that it could only build factories with a positive bank balance over a certain amount. Another example is that an agent may succeed in maximizing profit because no pre-condition was set on the sell product operator that indicated a maximum limit on the number of consumers interested in purchasing the product. In this way, the testing process enables the user to discover weaknesses in the encoding of simulation objects. It is less probable, although possible, that an agent will embody a profit optimization strategy that could be executed successfully in the real world. Because of the exponentially large number of operator combinations that can be created for a simulation, it is acknowledged that this process cannot be exhaustive in general; nonetheless, many useful features and errors in the model may be discovered and analyzed using this technique.

The purpose of the list query language module 421 is to enable reports to be created from simulations run in the object execution module 425. The list query language 421 can be used in other contexts as well. The list query language 421 is analogous to the Structured Query Language (SQL) which is a syntax for specifying and executing statements in relational algebra. A list query language specifies and executes queries in list algebra. Lists, unlike sets, may contain duplicate members. A list query language module 421 can include a data store comprised of lists, which are named ordered heterogeneous collections of lists and objects. Objects are automatically considered members of lists defined by the classes the object is derived from. The module 421 can also support list operators such as union, intersection, and difference; predicates such as equivalence, greater than, less than, contains etc.; Boolean operators for combining predicates such as And, Or, and Not; expressions for evaluating object variables and methods; expressions for selecting object variables and methods for output; aggregation operators such as sum, average, median, standard deviation, count; and a syntax for combining the above elements into unambiguous queries. SQL SELECT statements are an example of a query syntax that would meet these requirements with some adjustments. For example, adjustments to the syntax of the FROM clause would be required to support list selection and list operators rather than relational projection.

The list query language module 421, in an exemplary embodiment, can be used in a command line style interface, or in a graphical user interface where list queries are entered in a window and the results displayed in a window. The list query language module 421 can also be used by invocation from other modules via a form of inter-process or inter-machine communication. For example, the ODBC standard provides an inter-process or inter-machine method of executing statements in the SQL language and returning the results.

The object execution module 425 provides a data store of lists once objects are loaded and after any processing or execution of those objects. All data and objects created during the simulation are accessible to the list query language module 421. It is noted that the underlying data structure of lists is not the same as relational tables (stored in the database 119 of FIG. 1). For example, relational tables cannot contain other relational tables. In relational databases, tuples must indicate their membership in lists by adding a column for each list the tuples are to be a member of. Alternately, new tables must be constructed for each link between differing tables. Because a foreign key column can only refer to one table, dealing with heterogeneous lists in relational databases results in a proliferation of columns and tables. In contrast, lists can link to heterogeneous objects. For example, the list California can include both stores and employees.

A visual list query language module 419 enables the graphical layout and formatting of query results computed using a list query language 421. The visual list query language module 419 can include a user interface that displays a grid. Each cell in the grid can have the formatting capabilities associated with modern spreadsheets, i.e. specification of width, fonts, color, numeric formatting, etc. In addition, the module 419 has a user interface that allows entry of valid list queries in the list query language into cells. Similar to a spreadsheet formula, the list query is executed and the result displayed in the cell if the result is a single scalar value. If the result is a list or a table of values, room may be made for the result by inserting the necessary number of rows and then placing the results in the new rows. Optionally, typical spreadsheet formulas may also be entered in cells as a method of computing results. For example, if two cells contain list queries that aggregate results of a simulation, then a third cell may contain a formula to divide the first two cells, to display the ratio.

Furthermore, the enhanced visual list query language module 419 can provide a user interface mechanism that allows the user to specify a list query called a filter query that filters objects for use by subsidiary list queries. The module 419 can also provide for a user interface mechanism that allows the user to specify that certain queries are to operate on the filtered results of filter queries. For example, the user could specify a rectangular area of the grid which is subject to the filter query. It is noted that filter queries themselves can be subject to operating on results of filter queries.

One advantage of the enhanced visual list query module 419 is the easy re-use of summary reports. For example, a visual list query report could be constructed that displayed an income statement. By changing the filter query to select all transactions from Company A to Company B, the income statement would be recomputed to show Company B's results rather than Company A's results. As another example, if a visual list query report represents a profit and loss statement the user could change a filter query to consider only products in the "DVD" list. Or the filter query could specify date restrictions to change the time period consolidated in the report.

A verification feature for the visual list query module 419 assists the user in rapidly understanding the sources of data used in a report created using the visual list query module 419. A report created using the visual list query module 419 includes a collection of queries on a grid. The values computed by the queries are normally shown. Queries will often be much longer than much more screen or printed space. The verification feature can include a visual list query module 419; a user interface that allows the user to enter a query called a test query using a list query language; and a method that compares all of the sources of data used by each report query with the test query. If any source of data is used in both a report query and the test query, the method highlights the cell of the report query.

A highlight is a graphical method of distinguishing a cell from an unhighlighted cell, and may include a change in colors, background, border, font, the addition of symbols or icons, combinations of the foregoing, or other similar techniques. This allows the user to enter a test query, say for example "SELECT ALL TOYS", and if any cells in the report were constructed from members of the list "TOYS", then those cells would be highlighted. As an extension, several test queries could be constructed, and each assigned a unique representation, for example colored shape. Each cell which matched according to the above criteria would have a marker of that color placed in the cell. Thus multiple sources of information could be graphically indicated on a report simultaneously. For example, if the test query "SELECT ALL TOYS" were assigned the marker green circle, and the test query "SELECT ALL DVDS" were assigned the marker red square, then the total profit cell would show a green circle if it were derived in any way from TOYS and a red square if it were derived in any way from DVDS.

The following elements can be combined to enable a new process enabling large groups to build dynamic, executable models of business activity: a modeling module 401, an object execution module 425, an object storage system accessible via a network 427, and a workflow router 405, 429.

The new process for building models of business activity can include the following steps. A requesting user creates a functor requestor object from a Functor Requestor class 325. Next, the requesting user sets the recipient and a human readable description. The requesting user attaches either (a) executable code or (b) an activator for executable code. An example of an activator would be a spreadsheet document that can be used in activating a previously installed spreadsheet program. Another example of an activator is a Uniform Resource Locator (URL) as used in the world wide web. This program code or activator may serve to perform one or more of the following functions: collect the response, validate the response or provide context for the response. Further, the requesting user defines a class interface that the returned response must conform to or be derived from. This class interface may be implied by the executable code or activator specified in the previous step. The functor requestor object is saved into a object storage system 427. A workflow router 405, 429 is notified of the request and routes it to the recipient. When a responding user wishes to respond to a request, the functor requester object is retrieved from the object storage system 427. The client program activates any enclosed computer program or activator for program code to collect the response. The response is encoded as (a) executable code or (b) an activator for executable code. This response should represent a function or functions that comply with the class interface specified by the requestor. Useful Functor classes 325 may be provided for the user to create response programs with. For example, the user can create objects of provided Distribution Functor classes 329 that allow returning a statistical distribution as a functor.

Next, the responding user can update their response an arbitrary number of times while the functor requestor is active. The responding user can forward the functor requestor object to another user who should provide the response instead. It is called delegation if the forwarding user designates that the response will be returned only with the forwarding user's approval. It is called transfer if the forwarding user does not require approval before the response is returned to the original requestor.

The above process provides a number of advantages. The requesting user does not have to execute a separate integration step whenever the respondent updates their response, because the response complies with a class interface specification. Also, the responding user can update their response as many times as desired until the request is deactivated or deleted. Another advantage is that the responding user can provide their response in the form of a computer program that may provide results that vary depending on inputs or external data, and this response is integrated directly into the requesting user's model. Further, the responding user can provide, and the requesting user can use additional interfaces of the Functor to provide different inputs to the Functor to obtain different outputs.

The following is an example of how the above process could be used to build a large scale model of business activity. User A defines a model of the business in which raw materials are converted into widgets, stores are built, widgets are transported to stores, and stores sell widgets. User A does not know the cost function of any of these activities. User A sends a functor requester to User B that requests the rate that widgets can be made per week. User B responds with a function that provides the rate as a function of lead time and volume. User A sends a functor requestor to User C that requests rate of store openings and User C responds with a functor that provides the rate as a function of monthly capital investment flows. User A sends a functor requester to User D that requests per-unit shipping costs, and User D responds with a functor that provides the rate as a function of weekly volumes between sources and destinations. User A sends a functor requestor to User E that requests the cost of store operations, and User E responds with a functor that provides the cost per store as a function of store hours open per week.

After all responses have been provided, User A has a collection of functors that are assembled into a simulation framework. The framework can be placed in a manual simulation where inputs to functors are changed one at a time such as the what-if module, or in an automated process such a testing module that automatically changes inputs to functors to optimize certain outputs.

Hardware Overview

Figure 5:
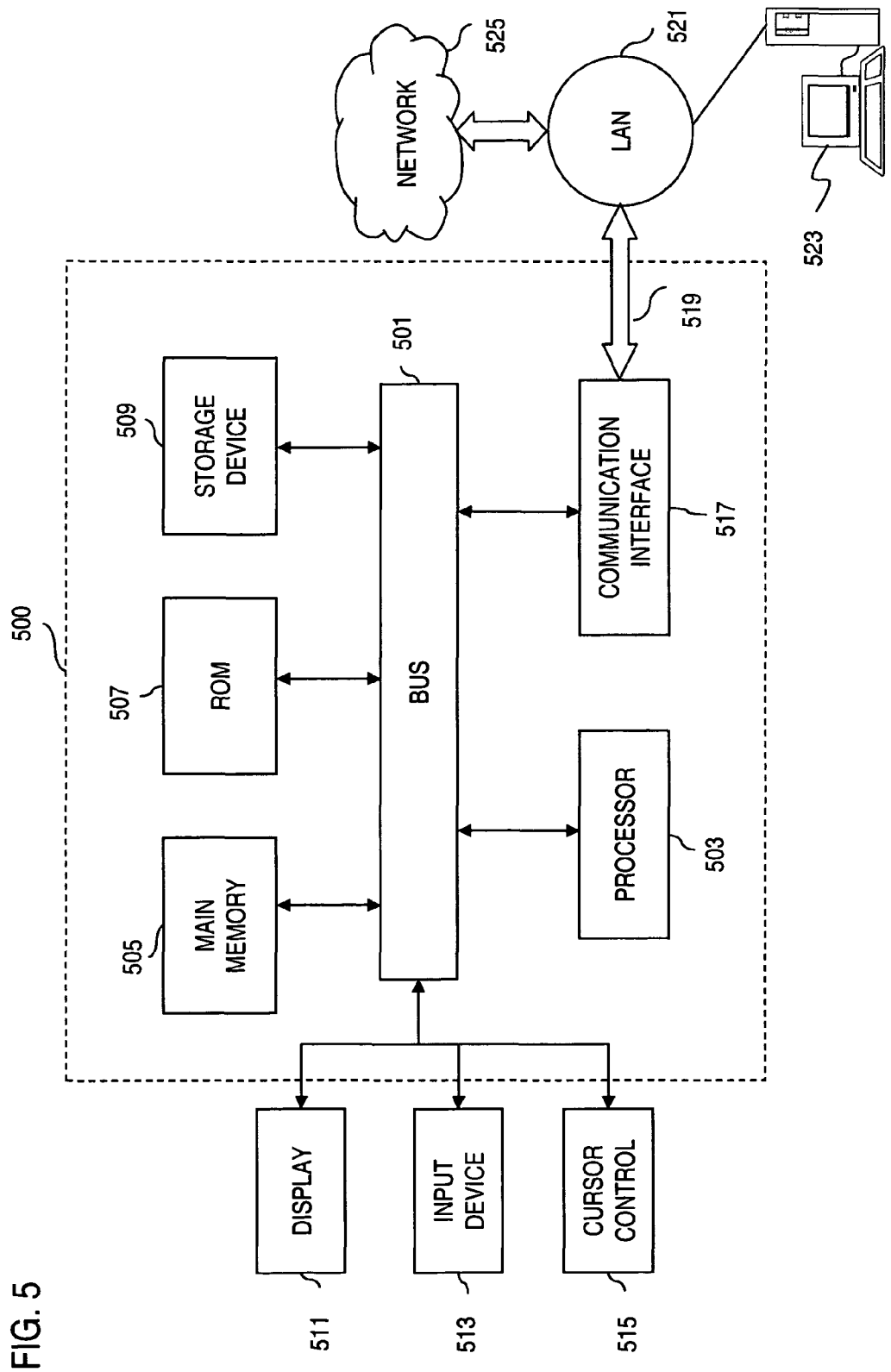
FIG. 5 depicts a computer system that can be used to implement an embodiment of the present invention.

FIG. 5 illustrates a computer system 500 upon which an embodiment according to the present invention can be implemented. The computer system 500 includes a bus 501 or other communication mechanism for communicating information and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions by the processor 503. The computer system 500 may further include a read only memory (ROM) 507 or other static storage device coupled to the bus 501 for storing static information and instructions for the processor 503. A storage device 509, such as a magnetic disk or optical disk, is coupled to the bus 501 for persistently storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is a cursor control 515, such as a mouse, a trackball, or cursor direction keys, for communicating direction information and command selections to the processor 503 and for controlling cursor movement on the display 511.

According to one embodiment of the invention, the processes of forecasting and modeling are provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, a telephone modem, or any other communication interface to provide a data communication connection to a corresponding type of communication line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although a single communication interface 517 is depicted in FIG. 5, multiple communication interfaces can also be employed.

The network link 519 typically provides data communication through one or more networks to other data devices. For example, the network link 519 may provide a connection through local network 521 to a host computer 523, which has connectivity to a network 525 (e.g. a wide area network (WAN) or the global packet data communication network now commonly referred to as the "Internet") or to data equipment operated by a service provider. The local network 521 and the network 525 both use electrical, electromagnetic, or optical signals to convey information and instructions. The signals through the various networks and the signals on the network link 519 and through the communication interface 517, which communicate digital data with the computer system 500, are exemplary forms of carrier waves bearing the information and instructions.

The computer system 500 can send messages and receive data, including program code, through the network(s), the network link 519, and the communication interface 517. In the Internet example, a server (not shown) might transmit requested code belonging to an application program for implementing an embodiment of the present invention through the network 525, the local network 521 and the communication interface 517. The processor 503 may execute the transmitted code while being received and/or store the code in the storage device 509, or other non-volatile storage for later execution. In this manner, the computer system 500 may obtain application code in the form of a carrier wave.

The term "computer-readable medium" as used herein refers to any medium that participates in providing instructions to the processor 503 for execution. Such a medium may take many forms, including but not limited to non-volatile media, volatile media, and transmission media. Non-volatile media include, for example, optical or magnetic disks, such as the storage device 509. Volatile media include dynamic memory, such as main memory 505. Transmission media include coaxial cables, copper wire and fiber optics, including the wires that comprise the bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

CONCLUSION

Accordingly, an approach is provided to address the need for a software system that supports enterprise data collection to build large scale simulation models, which can be linked into a single up-to-date model of planned corporate activity and options. The software system advantageously provides re-usable financial components, and enables auditing and analysis of historical plans and beliefs.

While the present invention has been described in connection with a number of embodiments and implementations, the present invention is not so limited but covers various obvious modifications and equivalent arrangements, which fall within the purview of the appended claims.

What is claimed is:

1. A method for generating a financial model, implemented by one or more processors programmed by a set of instructions to perform the steps of:
    collecting data in a multi-user peer-to-peer collaborative environment over a data network by:
        issuing functor requests through a workflow router to users for data and programs;
        receiving one or more functor objects from the users, wherein one or more functor objects comprise collections of variables which can be acted on by methods and wherein said one or more functor objects is received in response to the functor requests and contain the data and programs from the users;
    the one or more processors generating a financial model, comprising a simulation framework based upon the received one or more functor objects; wherein said simulation framework includes a variety of classes, wherein one or more of the classes corresponds to a variable template and method used to create and manipulate a functor object, by:
        (a) inputting functor objects into the financial model; and
        (b) using the variable template and method of one or more of the variety of classes included in the simulation framework to manipulate the collections of variables represented by the one or more functor objects.

2. A method according to claim 1, wherein the collected data resides within a spreadsheet, the method comprising:
    mapping content from a plurality of cells of the spreadsheet to the one or more functor objects, wherein the content includes the data and programs for the functor objects for input into the financial model.

3. A method according to claim 1, wherein the collected data resides within a spreadsheet, the method comprising:
    mapping content including the data from a plurality of cells of the spreadsheet to one or more classes, wherein each of the one or more classes duplicates functionality of the spreadsheet when the functor object is used to encapsulate or access the one or more classes.

4. A method according to claim 1, wherein the one or more processors are further programmed to perform the steps of:
    outputting the financial model;
    providing a user with a plurality of input parameters including operators;
    dynamically receiving one of the input parameters from the user in support of what-if analysis of the financial model; and
    generating a simulation result in response to the received input parameter for retrieval by the user over the data network.

5. A method according to claim 4, the method comprising:
    generating a report of the simulation result via a list query language module that specifies and executes queries in list algebra, wherein the user places an arbitrary list query in at least one cell of a report grid for display.

6. A method according to claim 5, further comprising:
    selecting a plurality of cells in the report grid; and
    specifying a list query for collecting objects into a set, wherein a graphical embellishment is applied to cells including an object contained in the set.

7. A method according to claim 1, wherein a first user issues a functor request for requesting information relating to the financial model, and the functor request includes a program to collect the information and to validate a response from a second user, a response functor object received from the second user responsive to the functor request conforming to a class interface specified by the first user, the method further comprising:
    storing the functor request; and
    selectively forwarding the functor request to the second user.

8. A method according to claim 1, wherein the functor objects received from users responsive to the functor requests specify the necessity of additional inputs.

9. A computer-readable storage medium bearing instructions for generating a financial model, the instructions being arranged, upon execution, to cause one or more processors to perform the steps of:
    the one or more processors collecting data in a multi-user peer-to-peer collaborative environment over a data network by:
        issuing functor requests through a workflow router to users for data and programs;
        receiving one or more functor objects from the users, wherein said one or more functor objects comprise collections of variables which can be acted on by methods and wherein said one or more functor objects is received in response to the functor requests and contain the data and programs from the users;
    generating a financial model, comprising a simulation framework based upon the one or more received functor objects, wherein said simulation framework includes a variety of classes and wherein one or more of the classes corresponds to a variable template and method used to create and manipulate a functor object, by:
        (a) inputting functor objects into the financial model; and (b) using the variable template and method of one or more of the variety of classes included in the simulation framework to manipulate the collections of variables represented by the one or more functor objects.

10. A system for generating a financial model, the system comprising:
   at least one memory including computer program instructions stored as program code thereon, and
   at least one processor, where said at least one processor upon execution of the program code, causes the system to perform at least the following:
      collecting data in a multi-user peer-to-peer collaborative environment over a data network by issuing functor requests through a workflow router to at least one of a plurality of users for data and programs; receiving one or more functor objects from the at least one of a plurality of users, wherein one or more functor objects comprise collections of variables which can be acted on by methods and wherein said one or more functor objects is received in response to the functor requests and contain the data and programs from the at least one of a plurality of users;
      generating a financial model, comprising a simulation framework based upon the one or more received functor objects, wherein said simulation framework includes a variety of classes, wherein one or more of the classes corresponds to a variable template and method used to create and manipulate a functor object, by:
         (a) inputting functor objects into the financial model; and
         (b) using the variable template and method of one or more of the variety of classes included in the simulation framework to manipulate the collections of variables represented by the one or more functor objects.

11. A system according to claim 10, wherein the collected data resides within a spreadsheet, and said at least one processor further causes the system to perform:
   mapping content from a plurality of cells of the spreadsheet to the one or more functor objects, wherein the content includes the data and programs for the functor objects for input into the financial model.

12. A system according to claim 10, wherein the at least one processor further causes the system to perform:
   providing content including the data from a plurality of cells of a spreadsheet to one or more classes, wherein each of the one or more classes duplicates functionality of the spreadsheet when the functor object is used to encapsulate or access the one or more classes.

13. A system according to claim 10, wherein the at least one processor further causes the system to perform:
   executing the generated financial model, the financial model providing operators; and
   providing a what-if analysis to dynamically process an input parameter from a user, the input parameter corresponding to an operator provided by the financial model.

14. A system according to claim 13, wherein the at least one processor further causes the system to perform:
   generating a report of the simulation result, wherein queries are specified and executed in list algebra.

15. A system according to claim 10, wherein a first user issues a functor request for requesting information relating to the financial model, and the functor request includes a program to collect the information and to validate a response from a second user, a response functor object received from the second user responsive to the functor request conforming to a class interface specified by the first user, wherein the at least one processor further causes the system to perform:
   storing the functor request; and
   selectively forwarding the functor request to the second user.

16. A system according to claim 10, wherein the at least one processor further causes the system to perform:
   soliciting input from the plurality of users to simulate a plurality of scenarios relating to the financial model, the scenarios corresponding to different competitive goals assigned to the users, the simulation comprising a plurality of classes and functor objects.

17. A system according to claim 16, wherein the at least one processor is further configured to perform, responsive to the inputs from the plurality of users, one of adding arbitrary new classes or functor objects to the simulation, or making arbitrary changes to a class or functor object currently in the simulation.

* * * * *